No. 668,739.  
R. E. PEDIGO.  
SEPARABLE APPARATUS FOR WARMING AND RAISING DOUGH.  
(Application filed Oct. 20, 1900.)  
(No Model.)  
Patented Feb. 26, 1901.

Witnesses:  
R. G. Orwig.  
R. H. Orwig.

Inventor: Richard E. Pedigo.  
By Thomas G. Orwig, Attorney.

THE NORRIS PETERS CO., PHOTO-LITHO., WASHINGTON, D. C.

UNITED STATES PATENT OFFICE.

RICHARD E. PEDIGO, OF CHARITON, IOWA, ASSIGNOR TO FRANK A. VAN NICE, OF RUSSELL, IOWA.

SEPARABLE APPARATUS FOR WARMING AND RAISING DOUGH.

SPECIFICATION forming part of Letters Patent No. 668,739, dated February 26, 1901.

Application filed October 20, 1900. Serial No. 33,693. (No model.)

*To all whom it may concern:*

Be it known that I, RICHARD E. PEDIGO, a citizen of the United States, residing at Chariton, in the county of Lucas and State of Iowa, have invented a new and useful Separable Apparatus for Warming and Raising Dough, of which the following is a specification.

My object is to provide a simple, strong, and durable apparatus specially adapted for warming sponge for making bread and also adapted to be advantageously used for keeping cooked food warm and moistening the atmosphere in a dining-room.

My invention consists in the construction, arrangement, and combination of parts, as hereinafter set forth, pointed out in my claim, and illustrated in the accompanying drawings, in which—

Figure 1:
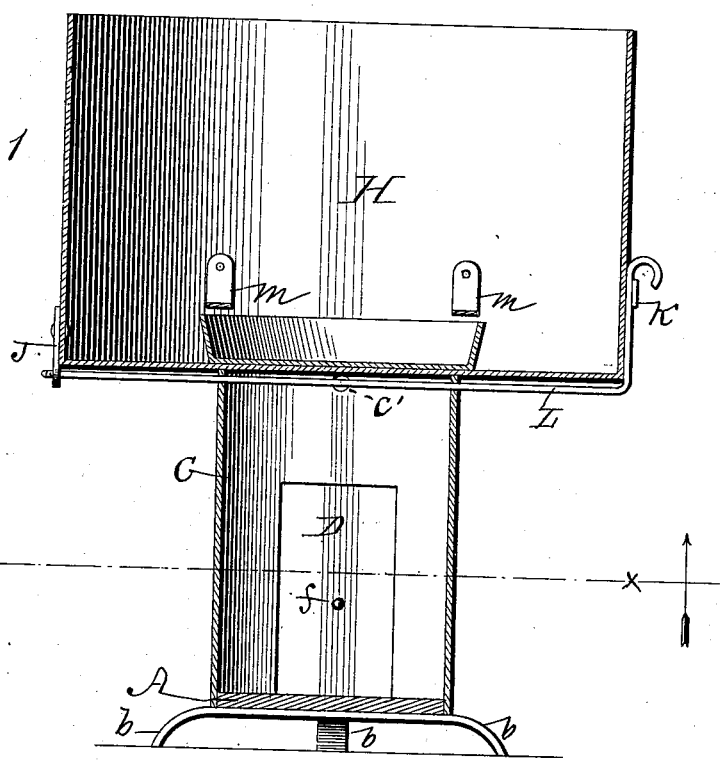
Figure 2:
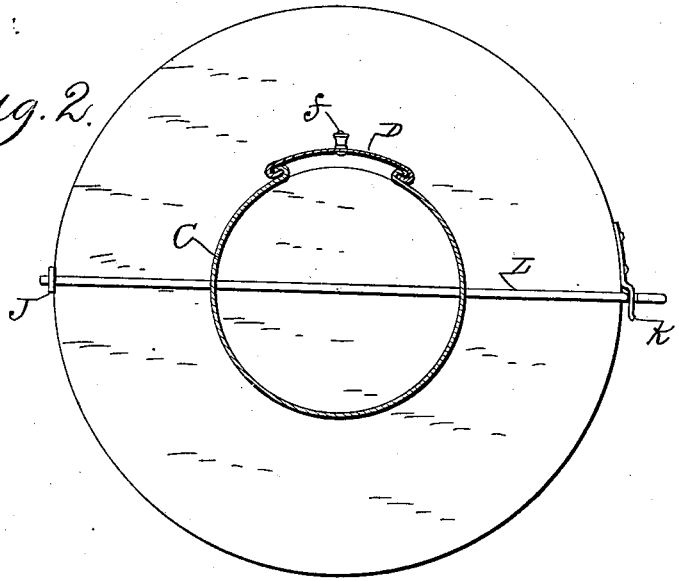

Figure 1 is a vertical sectional view of the apparatus, showing the relative positions of all the parts. Fig. 2 is a transverse sectional view on the line $x\ x$ of Fig. 1 looking upward and shows how the door is slidably connected with the cylindrical lamp-chamber and the warming-chamber with the lamp-chamber.

The letter A designates the bottom for the lamp-chamber, made of wood and reinforced by wooden feet $b$, fixed to the under side thereof.

C is a cylindrical lamp-chamber made of sheet metal and fitted and fixed to the edge of the wooden bottom A by means of nails or screws. The top end portion has perforations $C^2$ for the purposes of creating an upward draft, ventilating the lamp-chamber, and distributing heat under the bottom of the warming-chamber.

An opening for gaining access to the lamp-chamber has its parallel edges turned outward, and a door D, fitted thereto, has its parallel edges turned inward to engage them, so the door can be readily attached to slide up and down as required in opening and closing it. A knob $f$ on the exterior of the door is adapted for taking hold thereof to move the door.

H is a cylindrical open-topped warming-chamber made of sheet metal and of larger diameter than the lamp-chamber A. It has a perforated ear J fixed on its outside to extend below its bottom, and a clasp K opposite. A wire or metal rod L is bent upward at one end in such a manner that when the horizontal portion is extended through coinciding perforations in the top of the lamp-chamber and the ear J the vertical part can be pressed under the clasp K as required to retain the warming-pan for the purpose of supporting pans or dishes containing food over the top of the lamp-chamber.

Cross-pieces $m$ are fixed to the inside of the warming-pan, upon which pans and jars can be supported and a pan for containing water placed under them to aid in distributing the heat and to moisten the hot air.

It is obvious a suitable cloth or flexible cover may be placed over the top of the warming-pan or a removable sheet-metal cover fitted thereto for closing the warming-pan when desired.

Having described the purpose, construction, and operation of my invention, its practical utility will be obvious to persons familiar with the art to which it pertains.

What I claim as new, and desire to secure by Letters Patent, is—

In an apparatus for warming and raising bread, the combination of a cylindrical chamber closed at its bottom and open at its top and provided with alining openings near its top and a cylindrical open-topped chamber provided with a perforated ear at one side and a clasp at its opposite side, and a bent rod adapted to pass through the said perforated ear and the alining openings in the lamp-chamber and to be turned to engage the said clasp, as shown and described for the purposes stated.

RICHARD E. PEDIGO.

Witnesses:
JOHN CULBERTSON,
L. H. BUSSELLE.